United States Patent [19]

Schmidt et al.

[11] Patent Number: 4,904,125

[45] Date of Patent: Feb. 27, 1990

[54] PROCESS FOR STRENGTHENING GEOLOGICAL FORMATIONS

[75] Inventors: Manfred Schmidt, Dormagen; Manfred Kapps, Bergisch Gladbach; Max Mann, Odenthal; Peter Vehlewald, Leichlingen; Manfred Dietrich, Leverkusen; Frank Meyer, Essen; Wolfgang Cornely, Gladbeck; Hans E. Mehesch, Essen, all of Fed. Rep. of Germany

[73] Assignees: Bayer Aktiengesellschaft, Leverkusen; Bergwerksverband GmbH, Essen, both of Fed. Rep. of Germany

[21] Appl. No.: 348,849

[22] Filed: May 8, 1989

[30] Foreign Application Priority Data

May 10, 1988 [DE] Fed. Rep. of Germany ....... 3815947

[51] Int. Cl.$^4$ ........................ E02D 3/12; C08G 18/76
[52] U.S. Cl. .................................... 405/264; 166/295; 299/11; 523/130; 523/132
[58] Field of Search ................ 166/295; 405/264, 267, 405/269; 299/11; 523/130, 131, 132

[56] References Cited

U.S. PATENT DOCUMENTS

| | | | |
|---|---|---|---|
| 3,268,002 | 8/1966 | Fischer | 405/264 X |
| 3,432,451 | 3/1969 | Kales | 523/132 |
| 4,113,014 | 9/1978 | Kubens et al. | 166/295 |
| 4,114,382 | 9/1978 | Kubens et al. | 405/264 |
| 4,452,551 | 6/1984 | Arndt et al. | 405/264 |
| 4,454,252 | 6/1984 | Meyer | 405/264 X |
| 4,475,847 | 10/1984 | Cornely et al. | 405/264 |
| 4,715,746 | 12/1987 | Mann et al. | 405/364 |
| 4,792,262 | 12/1988 | Kapps et al. | 405/264 |

FOREIGN PATENT DOCUMENTS 1758185 10/1970 Fed. Rep. of Germany .
1784458 10/1971 Fed. Rep. of Germany .
885762 12/1961 United Kingdom .

OTHER PUBLICATIONS

Gluckauf 1968 pp. 666–670.
Gluckauf 1977 pp. 707–711.
Bergbau 1977 pp. 124–129.

Primary Examiner—George A. Suchfield
Attorney, Agent, or Firm—Joseph C. Gil; Thomas W. Roy

[57] ABSTRACT

The present invention is directed to a process for the strengthening of geological formations in underground workings and mines by the introduction of reaction mixtures which react to form polyurethanes into the formations which are to be strengthened, the reaction mixtures being based on
(a) a polyisocyanate component,
(b) a polyol component and
(c) an ester,
the ester having a hydroxyl number of about 10 to 630 and an acid number of at most 10 and obtained from (i) an acid component having a carboxyl functionality of at least 1.5 and containing a polymerized fatty acid having at least 12 carbon atoms or mixtures thereof with unpolymerized saturated or unsaturated fatty acids having at least 12 carbon atoms and (ii) a polyol component containing at least one polyhydric alcohol, the ester being present in a positive amount of up to 5% by weight, based on the weight of component (b).

11 Claims, No Drawings

PROCESS FOR STRENGTHENING GEOLOGICAL FORMATIONS

BACKGROUND OF THE INVENTION

1. Field of the Invention

This invention is directed to a new process for strengthening geological formations in underground workings or mines, in particular in coal mines, with reaction mixtures based on organic polyisocyanates and polyhydroxyl compounds which contain special esters of (i) polymerized unsaturated fatty acids or mixtures thereof with monomeric fatty acids and (ii) low molecular weight, polyhydric alcohols as compounds for regulating the foaming process.

2. Description of the Prior Art

The strengthening of geological formations below ground, particularly in coal mining, by means of foamable polyurethanes which harden within the formation is already known (see e.g. The Journal Glückauf (1968), pages 666 to 670; Glückauf (1977), pages 707 to 711; and Bergbau (1977) pages 124 to 129, DE-PS 1,129,894, DE-PS 1,758,185, DE-PS 1,784,458, DE-PS 2,436,029, DE-PS 2,623,346 and DE-PS 3,139,395). Such mixtures which react to form polyurethanes are also used for producing barriers which seal off water and/or gas.

The above-mentioned process, which is regarded as state of the art, is generally carried out as follows: the two components of the reaction, i.e., the polyisocyanate and the polyhydric alcohol (polyhydroxyl component), are carried separately to a point in front of the bore hole where they are continuously combined in a static mixer and forced through the bore hole into the rock formation where the mixture foams up and hardens.

Geological formations which are to be strengthened on this basis, in particular layers of rock below ground, vary considerably in their water content. This means that if reaction mixtures essentially containing polyisocyanates and the conventional polyether polyols if polyurethane chemistry are used, the polyisocyanate component reacts with the water present in the formation to an extent which cannot be controlled. If the water content in the layers of rock is high, the reaction may result in a lightweight polyurea foam which does not provide sufficient strengthening of the rock formation. To ensure adequate and homogeneous strengthening of the rock formation, it is necessary to achieve controlled and homogeneous formation of foam regardless of the water content of the formation. It should also be possible to predetermine the properties of the resulting foams by suitable choice of the composition of the reaction mixture regardless of the water content. It has been shown in the past that the use of castor oil in addition to the known polyether polyols in the polyol component is a first step in this direction. The addition of castor oil, generally in quantities of about 5 to 20% by weight, based on the polyol component, reduces the tendency of unwanted side reactions between polyisocyanate and water. This suppresses excessive foaming of the polyurethane resins, especially in contact with the water present in the formation and, thus, prevents the loss of mechanical properties which would otherwise occur.

It has been found in practice, however, that it would be desirable to reinforce the ability of castor oil to suppress the unwanted reaction between isocyanate and water in order to produce a very homogeneous polyurethane resin which will ensure uniform strengthening of the rock formation.

Another disadvantage of using castor oil is that it is a natural product which is therefore subject to considerable variations in its properties. Further, since castor oil is required to be used in large quantities as mentioned above, it constitutes a considerable cost factor because the cost of this natural product is subject to wide fluctuations and may even be greater than the cost of conventional polyether polyols.

It is therefore an object of the present invention to provide a new process for strengthening geological formations which would be more capable of suppressing the unwanted reaction between isocyanate and water and the resulting uncontrolled foaming up of the reaction mixture than has previously been possible in the art.

This object has been achieved by the process according to the invention described below, in which certain esters of polymerized unsaturated fatty acids or mixtures thereof are used in combination with monomeric saturated or unsaturated fatty acids and low molecular weight alcohols. It has surprisingly been found that by using these esters it is possible not only to exceed the above-mentioned advantageous property of castor oil but also to substantially improve the mechanical properties of the polyurethane products. The addition of esters of polymerized fatty acids and low molecular weight polyols prevents the formation of lightweight foams even in rock layers with a high water content so that the process according to the invention provides uniformly expanded polyurethanes with excellent mechanical properties.

The finding that esters of polymerized unsaturated fatty acids and low molecular weight polyols prevent the formation of lightweight foams is surprising since the polymerized unsaturated fatty acids from which these esters are obtained act as stabilizers for polyurethane foams and therefore have exactly the opposite effect. Thus according to U.S. Pat. No. 3,476,933, di- and trimerized fatty acids are used for the production of polyurethane foams with large cells. Unesterified polymerized fatty acids have no influence on the reaction between isocyanate and water in the process according to the invention and do not prevent the uncontrolled foaming up of the reaction mixture.

SUMMARY OF THE INVENTION

The present invention is directed to a process for the strengthening of geological formations in underground workings and mines by the introduction of reaction mixtures which react to form polyurethanes into the formations which are to be strengthened, the reaction mixtures being based on (a) a polyisocyanate component,
(b) a polyol component and
(c) an ester, the ester having a hydroxyl number of about 10 to 630 and an acid number of at most 10 and obtained from (i) an acid component having a carboxyl functionality of at least 1.5 and containing a polymerized fatty acid having at least 12 carbon atoms or mixtures thereof with unpolymerized saturated or unsaturated fatty acids having at least 12 carbon atoms and (ii) a polyol component containing at least one polyhydric alcohol, the ester being present in a positive amount of up to 5% by weight, based on the weight of component (b).

DETAILED DESCRIPTION OF THE INVENTION

The polyisocyanate component (a) to be used according to the invention is preferably based on polyphenylene polymethylene polyisocyanates which may be obtained by the aniline/formaldehyde condensation followed by phosgenation ("polymeric MDI") or derivatives of these polyisocyanates which are liquid at room temperature and contain carbodiimide, biuret, urethane and/or allophanate groups. The polyisocyanate mixtures ("polymeric MDI") which are liquid at room temperature and are obtainable by the phosgenation of aniline/formaldehyde condensates, and the liquid, isocyanate-containing products obtained from these polyisocyanate mixtures by reacting them with subequivalent quantities (NCO/OH molar ratio = 1:0.005 to 1:0.3) of polyhydric alcohols in the molecular weight range of 62 to about 3000, in particular polyols containing ether groups and having molecular weights of 106 to about 3000, are preferred. Mixtures of 2,4'- and 4,4'-diisocyanatodiphenyl methanes which are liquid at room temperature are also suitable as polyisocyanate component (a). Other organic polyisocyanates, e.g. those mentioned in DE-OS 2,832,253, pages 10 and 11 (U.S. Pat. No. 4,263,408, herein incorporated by reference), may also be used according to the invention. Polyisocyanate mixtures of the diphenylmethane series having a viscosity at 25° C of about 50 to 500 mPas and an isocyanate content of about 30 to 33% by weight are particularly preferred.

Polyol component (b) is based on organic polyhydroxyl compounds or mixtures of organic polyhydroxyl compounds having an OH number of about 100 to 800, preferably about 250 to 400. Polyol component (b) is preferably based on known polyether polyols or mixtures of such polyether polyols. When mixtures of different polyhydroxyl compounds are used, the hydroxyl number given refers to the mixture. This means that individual components of the mixtures may have a hydroxyl number outside the given range. Propoxylation products and/or ethoxylation products of divalent to octavalent starter molecules such as water, 1,2-dihydroxypropane, trimethylol propane, pentaerythritol, glycerol, sorbitol, ethylene diamine and cane sugar are preferred polyether polyols. Component (b) generally has an average hydroxyl functionality of about 2.0 to 5.0, preferably about 2.0 to 3. Suitable mixtures of this type may be obtained, for example, by subjecting mixtures of starter molecule of the type mentioned above to an alkoxylation reaction. Alternatively, separately prepared polyhydroxy polyethers may be mixed together after their preparation to form component (b) according to the invention.

As previously discussed, it is essential to the invention to incorporate fatty acid esters into the reaction mixture. The acid component (i) of the fatty acid esters is based on "polymerized unsaturated fatty acids" or mixtures thereof with monomeric saturated or unsaturated fatty acids. "Unsaturated fatty acids" in the present context are monoolefinically or polyolefinically unsaturated aliphatic monocarboxylic acids, preferably having a linear molecular structure, and containing carboxyl end groups with 12 to 22 carbon atoms, preferably 14 to 18 and most preferably 18 carbon atoms. The term "polymerized" applies in particular to the dimers and trimers of the acids. The acid component (i) from which the ester is obtained is preferably a mixture of dimerized and trimerized unsaturated fatty acids which may still contain considerable proportions of monomeric unsaturated fatty acids or saturated fatty acids. Commercially pure "trimeric acid," i.e., a "polymerized unsaturated fatty acid" having a trimeric acid content of up to 95%, is suitable for the preparation of the esters required for the invention. It follows from the preceding discussion that the composition of the acid component may vary within a wide range. The monomeric acid content, based on the total weight of the acid component, may vary from 0 to about 50% by weight, the dimeric acid content from 0 to about 100% by weight and the trimeric acid content from 0 to about 95% by weight. The average carboxyl functionality of the acid component is always at least 1.5.

The polymerization may in principle be carried out with any monounsaturated and/or polyunsaturated fatty acids containing from 12 to 22, preferably from 14 to 18 and most preferably 18 carbon atoms, e.g. lauroleic acid, myristoleic acid, palmitoleic acid, oleic acid, gadoleic acid, erucic acid, rizinenic acid, linoleic acid, linolenic acid, arachidonic acid, clupanodonic acid or any mixtures of such acids. The polymerization of such acids, which in itself is a reaction known in the art, gives rise to the above-mentioned mixtures of monomeric, dimeric and/or trimeric acids. Small quantities of saturated fatty acids containing 12 to 22, preferably 14 to 18 and most preferably 18 carbon atoms, may of course be added to the "polymerized fatty acids" before the preparation of the esters is carried out. Mixtures of monomeric acids containing a small proportion of saturated fatty acids may also be used for the preparation of the "polymerized unsaturated fatty acids," but the resulting acid mixture used for the preparation of the esters must in all cases have an average carboxyl functionality of at least 1.5. Suitable saturated fatty acids include n-dodecane carboxylic acid, palmitic acid and stearic acid.

"Polymerized unsaturated fatty acids" suitable for the preparation of the esters according to the invention are commercially available on the market, for example those sold by Unichema under the trademark Pripol.

The polyol component on which the esters according to the invention are based may be any polyhydric alcohols. Polyol component (ii) is preferably based on at least one polyhydric alcohol in the molecular weight range of 62 to 282. Examples of suitable polyhydric alcohols include ethylene glycol, diethylene glycol and higher homologues thereof, 1,2- and 1,3-dihydroxypropane, dipropylene glycol and higher homologues thereof, 1,2-dihydroxy butane, 1,3- 2,3-, 1,4- and 1,5-dihydroxy pentane, neopentyl glycol, 1,6- and 2,5-dihydroxy hexane, 2-methylpentane diol-(2,4), 3-methylpentane diol(1,5), 2-methyl- 2-propyl-propane diol-(1,3), 2,2-diethyl-propane diol-(1,3), 2-ethyl-hexane diol-(1,3), 2,5-dimethyl-hexane diol-(2,5), 2,2,4-trimethylpentane diol-(1,3), 2,2,4-trimethyl-hexane diol-(1,6), octadecane diol-(1,18), butene diol, butyne diol, glycerol, 1,1,1-trimethylol ethane, hexane triol-(1,2,4), 1,1,1-trimethylol propane, pentaerythritol, sorbitol, alcohols containing tertiary nitrogen atoms such as N,N-dimethylethanolamine, N-methyldiethanolamine, triethanolamine or any mixtures of the alcohols exemplified above. Hexane diol-(1,6) and 1,1,1-trimethylol propane and mixtures of these two polyhydric alcohols are particularly preferred for the preparation of the polyesters.

The preparation of the esters from components (i) and (ii) mentioned above as examples is carried out in known manner by esterification at temperatures from about 50 to 300° C, preferably about 100 to 250° C, optionally with azeotropic removal of the water of reaction and optionally with the aid of conventional esterification catalysts such as sulphuric acid, toluene sulphonic acid, acid ion exchange resins, Lewis acids such as $BF_3$ or metal catalysts such as $SnCl_2$, $ZnCl_2$, dibutyl tin oxide or titanium tetrabutyl ester (see also Kunststoff Handbuch, Volume 7, "Polyurethane", publishers Carl Hanser Verlag, 1983, pages 54 to 62, and the literature cited therein).

The esters (c) required according to the invention have a hydroxyl number of about 10 to 630, preferably about 20 to 282 and most preferably about 30 to 200, with a maximum acid number of 10.

The esters (c) according to the invention are used in a positive amount of up to 5% by weight for carrying out the process according to the invention, preferably in a quantity of about 0.01 to 1.0% by weight, most preferably about 0.05 to 0.5% by weight, based on the weight of component (b). They may be incorporated either with polyisocynate component (a) or polyol component (b) before the preparation of the reaction mixture.

Auxiliary agents and additives may optionally be used in accordance with the present invention and include (1) water, which may be used in a quantity of up to about 5% by weight, preferably up to about 4% by weight, based on the weight of component (b);

(2) up to about 2% by weight, preferably about 0.3 to 1% by weight, based on the reaction mixture of catalysts for the isocyanate addition reaction, e.g., organic tin compounds such as tin(II) octoate or dibutyl tin dilaurate or tertiary amines such as N,N-dimethylbenzylamine or triethylene diamine;

(3) flame retardants, e.g., phosphoric acid derivatives;

(4) low molecular weight alkane polyols having a hydroxyl number above 800, e.g, ethylene glycol, propylene glycol and/or trimethylol propane;

(5) castor oil; and (6) organic or inorganic fillers, e.g., urea, calcium carbonate, mica or talc.

Whereas fatty acid esters (c) which are essential to the invention may be incorporated with either the polyol component or the polyisocyanate component, the other, optional auxiliary agents and additives are generally combined with the polyol component before the process according to the invention is carried out.

For carrying out the process according to the invention, the starting components are mixed together in proportions corresponding to an isocyanate index of about 90 to 150, preferably about 120 to 140. The "isocyanate index" is the quotient of the number of isocyanate groups present in the reaction mixture divided by the number of isocyanate reactive groups present in the reaction mixture, multiplied by 100; water is included in the calculation as a difunctional compound.

For carrying out the process according to the invention, the fatty acid esters (c) which are essential to the invention are incorporated, as already mentioned, either with polyisocyanate component (a) or with polyol component (b), and the additional auxiliary agents and additives optionally used are incorporated with the polyol component (b). Subsequently components (a) and (b) are vigorously mixed. Conventional mixing apparatus known in the art may be used for this purpose.

The process according to the invention is carried out by methods known in the art, i.e., numerous holes about 2 to 6 meters in depth and about 20 to 80 mm in diameter are drilled into the formation which is to be strengthened and the mixtures according to the invention are introduced into these holes. As a rule, the bore holes are closed by a bore hole seal with a passage through which the reaction mixture may be injected by way of a pipe, a non-return valve being arranged in the passage to prevent the reaction mixture from flowing back out of the bore hole after injection has been completed. A pressure of up to or in excess of 100 bar may be employed for the injection; however, if the pressures employed are too high there is a risk of coal or rock breaking loose.

The process according to the invention may also be carried out by the method according to U.S. Pat. No. 3,698,196, in which the polyisocyanate component (a) and the polyol component (b) are separately introduced into the chambers of a two chamber cartridge in the proportions required for the above-mentioned isocyanate index. The cartridge is then introduced into the prepared bore hole where it is mechanically crushed to enable the two components to mix. After the cartridge has been crushed, the bore hole is closed. In this variation, the fatty acid esters (c) may also be added to either the polyisocyanate component or the polyol component and the auxiliary agents and additives optionally used are added to the polyol component. The two chamber cartridge process is, however, less preferred than the first mentioned procedure.

After the liquid reaction mixture has been introduced into the geological formation and the bore holes have been sealed, the mixture, which preferably foams up as it hardens, penetrates the rock formations under its own foaming pressure and at the same time completely fills the bore hole. The resulting polyurethane products, in particular foams, produce a permanent strengthening of the geological formation by virtue of their excellent adherence to the coal or rock and their excellent mechanical properties.

Due to the use of fatty acid ester (c), the carbon dioxide initially produced by the reaction with water escapes so that the desired foaming up and formation of the uniform, preferably coarse foam structure takes place only in the final phase of the reaction.

If the process were carried out without the additives which are essential to this invention, foaming would take place in the initial phase of the reaction, and this would lead to foam structures with an inhomogeneous density distribution in which large portions would have an insufficient density and therefore poor mechanical properties. The above-mentioned foaming up at the end of the reaction ensures that such undesirable variation in density of the foams will not occur and the foams will therefore always have a homogeneous density and homogeneous mechanical properties. The esters of polymerized, unsaturated fatty acids which are essential for this invention are not only substantially more effective in this respect than castor oil, which has previously been used for the same purpose, but they may also be used to reinforce the effect of castor oil in formulations containing castor oil.

The following examples serve for further illustration of the process according to the invention. All percentages are percentages by weight unless otherwise indicated.

The following starting components are used in the examples. OH numbers are provided in units of mg KOH/g polyol.

Polyether polyol I—prepared from a mixture of saccharose and propane diol-(1,2) in a molar ratio of 1:5 and propylene oxide and having an OH number of 380 and a viscosity of 580 mPas at 25° C.

Polyether polyol II—prepared from glycerol and propylene oxide and having an OH number of 380 and a viscosity of 450 mPas at 25° C.

Polyether polyol III—prepared from propane-diol-(1,2) and propylene oxide and having an OH number of 284 and a viscosity of 75 mPas at 25° C.

Castor oil I—first pressing, iodine number 87.2, OH number 158, water content 0.14% and viscosity 678 mPas at 25° C.

Polymeric MDI—an isocyanate obtained from the phosgenation of an aniline/formaldehyde condensate and containing an excess of 50% of diisocyanatodiphenyl methane, and having an isocyanate content of 33% by weight and viscosity 140 mPas at 25° C.

Ester A:
According to Preparation Example A below.
Ester B:
According to Preparation Example B below.

Preparation of Esters A and B (general method of procedure)

The acid component (i) and the polyol component (ii) were introduced into a reaction vessel. The reaction mixture was then heated to about 170° C. and the water of reaction formed was removed by distillation until no more water distilled over under the reaction conditions. 50 ppm (weight) of titanium tetrabutylate were then added, the temperature was raised to 200° C. and the pressure was at the same time reduced to 10 mbar. The reaction was carried out to completion under these conditions with continued removal of water of reaction by distillation.

Ester A:
Acid component: 45.67 kg of a commercial "polymerized, unsaturated fatty acid" based on olefinically unsaturated $C_{18}$ fatty acids containing about 40% of monomeric unsaturated fatty acid and about 60% of a mixture of dimeric and trimeric acid (Pripol 1055 of Unichema).
Polyol component:
9.18 kg of 1,1,1-trimethylol propane.
Analytical data:
Acid number: 1.8; Hydroxyl number 50; viscosity (25° C.): 28,000 mPas.

Ester B:
Acid component:
8.41 kg of a commercial "polymerized olefinically unsaturated fatty acid" based on olefinically unsaturated $C_{18}$ fatty acids containing 97% dimeric fatty acid and 3% trimeric fatty acid (Pripol 1010 of Unichema).
Polyol component:
2.11 kg of hexane diol-(1,6).
Analytical data:
Acid number: <0.1; hydroxyl number 41.6; viscosity (25° C.) 57,700 mPas.

In each of the following Examples 1 to 6, three parallel experiments were carried out, which differ in the quantity of water introduced. Examples 4, 5 and 6 according to the invention clearly show than an increase in the quantity of water from 1.0 to 5.0 g results in virtually no increase in expansion, in contrast to the Comparison Examples, in particular Example 1 (Comparison Example A). The systems according to the invention are thus to a large extent inert towards an excess of water with regard to foaming.

EXAMPLE 1 (COMPARISON EXAMPLE A)

The given quantities of polyol mixtures and the given quantities of water were mixed in an unwaxed cardboard beaker and then vigorously mixed with 120 g of polymeric MDI by manual stirring with a flat wooden spatula for 60 seconds. The mixture was then poured into a vertically suspended tube of polyamide film (circumference 134 mm) which was closed at the bottom. The height to which the liquid reaction mixture filled the tube before evolution of gas was set at 1 and used as reference measure for the expansion observed. The expansion is given as a multiple of the filling height and referred to as the "foaming factor." An increase in volume by 100% is therefore defined as a foaming factor of 2.0.

| Polyol mixture: | polyether polyol I | 53.1 g, | 52.0 g, | 50.9 g |
|---|---|---|---|---|
| | polyether polyol III | 45.9 g, | 45.0 g, | 44.1 g |
| water: | | 1.0 g, | 3.0 g, | 5.0 g |
| Polymeric MDI: | | 120 g, | 120 g, | 120 g |
| foaming factor: | | 1.9 | 4.1 | 6.6 |

The foam floated to the top in each case and distinctly separated from a less strongly foamed phase underneath (abrupt change in gross density). Experience has shown that such effects are an indication of insufficient strength (lack of mass in the upper region). Such formulations break down when used in underground mines.

EXAMPLE 2 (COMPARISON EXAMPLE B)

The process was carried out as described in Example 1.

| Polyol mixture: | polyether polyol I | 45.0 g, | 44.1 g, | 43.2 g |
|---|---|---|---|---|
| | polyether polyol III | 39.0 g, | 38.2 g, | 37.4 g |
| | castor oil I | 15.0 g, | 14.7 g, | 14.4 g |
| water: | | 1.0 g, | 3.0 g, | 5.0 g |
| Polymeric MDI: | | 120 g, | 120 g, | 120 g |
| foaming factor: | | 2.5 | 3.5 | 3.7 |

EXAMPLE 3 (COMPARISON EXAMPLE C)

Process as described in Example 1.

| Polyol mixture: | polyether polyol I | 45.0 g, | 44.1 g, | 43.2 g |
|---|---|---|---|---|
| | polyether polyol III | 39.0 g, | 38.2 g, | 37.4 g |
| | castor oil I | 15.0 g, | 14.7 g, | 14.4 g |
| | dimeric acid (Pripol 1055) | 0.1 g, | 0.1 g, | 0.1 g |
| water: | | 1.0 g, | 3.0 g, | 5.0 g |
| Polymeric MDI: | | 120 g, | 120 g, | 120 g |
| foaming factor: | | 2.2 | 3.4 | 3.7 |

EXAMPLE 4 (according to the invention)

Process as described in Example 1.

| Polyol mixture: | polyether | 45.0 g, | 44.1 g, | 43.2 g |

-continued

| | | | | |
|---|---|---|---|---|
| | polyol I polyether polyol II | 39.0 g, | 38.2 g, | 37.4 g |
| | castor oil I | 15.0 g, | 14.7 g, | 14.4 g |
| | Ester A | 0.1 g, | 0.1 g, | 0.1 g |
| water: | | 1.0 g, | 3.0 g, | 5.0 g |
| Polymeric MDI: | | 120 g, | 120 g, | 120 g |
| foaming factor: | | 1.7 | 2.3 | 2.6 |

The reaction product was uniformly expanded by blowing. No abrupt change in gross density was observable.

EXAMPLE 5 (according to the invention)

Process as described in Example 1.

| | | | | |
|---|---|---|---|---|
| Polyol mixture: | polyether polyol I | 45.0 g, | 44.1 g, | 43.2 g |
| | polyether polyol III | 39.0 g, | 38.2 g, | 37.4 g |
| | castor oil I | 15.0 g, | 14.7 g, | 14.4 g |
| | Ester B | 0.1 g, | 0.1 g, | 0.1 g |
| water: | | 1.0 g, | 3.0 g, | 5.0 g |
| Polymeric MDI: | | 120 g, | 120 g, | 120 g |
| foaming factor: | | 1.7 g, | 2.3 g, | 2.6 g |

EXAMPLE 6 (according to the invention)

Process as described in Example 1.

| | | | | |
|---|---|---|---|---|
| Polyol mixture: | polyether polyol I | 53.1 g, | 52.0 g, | 50.9 g |
| | polyether polyol III | 45.9 g, | 45.0 g, | 44.1 g |
| | Ester A | 0.1 g, | 0.1 g, | 0.1 g |
| water: | | 1.0 g, | 3.0 g, | 5.0 g |
| Polymeric MDI: | | 120 g, | 120 g, | 120 g |
| foaming factor: | | 1.5 | 2.2 | 2.4 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for strengthening geological formations and underground workings or mines by introducing a reaction mixture into the formation to be strengthened, the reaction mixture comprising
   (a) a polyisocyanate component,
   (b) a polyol component and
   (c) a positive amount of up to about 5% by weight, based on the weight of component (b), of a fatty acid ester having a hydroxyl number of about 10 to 630 and an acid number of at most 10, said fatty acid ester being based on (i) an acid component having a carboxyl functionality of at least 1.5 and comprising polymerized unsaturated fatty acids containing at least 12 carbon atoms or mixtures thereof with unpolymerized, saturated or unsaturated fatty acids containing at least 12 carbon atoms and (ii) a polyol component comprising at least one polyhydric alcohol.

2. The process of claim 1 wherein said acid component (i) consists essentially of dimeric and/or trimeric unsaturated fatty acids having from 14 to 18 carbon atoms.

3. The process of claim 1 wherein said acid component (i) consists essentially of a mixture of monomeric, dimeric and trimeric unsaturated fatty acids, each of which has from 14 to 18 carbon atoms.

4. The process of claim 1 wherein said polyol component (ii) comprises at least one polyhydric alcohol having a molecular weight of 62 to 286.

5. The process of claim 2 wherein said polyol component (ii) comprises at least one polyhydric alcohol having a molecular weight of 62 to 286.

6. The process of claim 3 wherein said polyol component (ii) comprises at least one polyhydric alcohol having a molecular weight of 62 to 286.

7. The process of claim 1 wherein said polyol component (ii) consists essentially of hexane diol-(1,6) and/or trimethylol propane.

8. The process of claim 2 wherein said polyol component (ii) consists essentially of hexane diol-(1,6) and/or trimethylol propane.

9. The process of claim 3 wherein said polyol component (ii) consists essentially of hexane diol-(1,6) and/or trimethylol propane.

10. The process of claim 1 wherein component (c) is blended with component (a) before preparation of the reaction mixture.

11. The process of claim 1 wherein component (c) is blended with component (b) before the preparation of the reaction mixture.

* * * * *